US012747963B2

(12) United States Patent
Paul

(10) Patent No.: US 12,747,963 B2
(45) Date of Patent: Sep. 29, 2026

(54) SYSTEM AND METHOD FOR COMPRESSED HIGH-DEFINITION (HD) MAP GENERATION

(71) Applicant: Samsung Electronics Company, Ltd., Suwon-si (KR)

(72) Inventor: Amrit Paul, Surrey (CA)

(73) Assignee: Samsung Electronics Company, Ltd., Suwon City (KR)

( * ) Notice: Subject to any disclaimer, the term of this patent is extended or adjusted under 35 U.S.C. 154(b) by 168 days.

(21) Appl. No.: 18/583,522

(22) Filed: Feb. 21, 2024

(65) Prior Publication Data

US 2025/0264340 A1 Aug. 21, 2025

(51) Int. Cl.
*G01C 21/00* (2006.01)
*G06F 40/284* (2020.01)

(52) U.S. Cl.
CPC ..... *G01C 21/3878* (2020.08); *G01C 21/3841* (2020.08); *G06F 40/284* (2020.01)

(58) Field of Classification Search
CPC ............ G01C 21/3878; G01C 21/3841; G06F 40/284
See application file for complete search history.

(56) References Cited

U.S. PATENT DOCUMENTS 10,885,452 B1 * 1/2021 Garg ........................ G06N 7/01
11,480,435 B2 10/2022 Li
11,630,458 B2 4/2023 Valois
11,630,826 B2 4/2023 Neill
11,698,272 B2 7/2023 Kroepfl
2022/0144304 A1 * 5/2022 Ehsanibenafati .... G06V 20/588
2022/0179857 A1 * 6/2022 Kompella ............. G06N 5/022
(Continued)

FOREIGN PATENT DOCUMENTS

WO WO 2020/154965 A1 8/2020
WO WO 2020/154966 A1 8/2020

OTHER PUBLICATIONS

Li, et al., "HDMapNet: An Online HD Map Construction and Evaluation Framework", arXiv:2107.06307v4 [cs.CV], Mar. 18, 2022, 7 pages.
(Continued)

*Primary Examiner* — Navid Z. Mehdizadeh
*Assistant Examiner* — Matthew Ho
(74) *Attorney, Agent, or Firm* — Baker Botts L.L.P.

(57) ABSTRACT

In one embodiment, a method includes accessing sensor data captured by mobile devices operating in multiple regions in an environment, generating graph embeddings associated with each mobile device for each region based on a compressed graph constructed from the sensor data, generating a refined graph for each region based on the graph embeddings associated with each mobile device by reconfiguring edges in the compressed graph, generating a graph high-definition (HD) map associated with each mobile device based on a fusion of the refined graphs, identifying prominent nodes and edges connecting the prominent nodes based on the graph HD map associated with each mobile device based on trace activations associated with the prominent edges, and generating a compressed graph HD map for the environment based on the prominent nodes and edges associated with the mobile devices and environmental information associated with the environment.

19 Claims, 10 Drawing Sheets

(56) References Cited

U.S. PATENT DOCUMENTS

| | | | | |
|---|---|---|---|---|
| 2022/0198283 | A1 * | 6/2022 | Patodia | G06F 16/2246 |
| 2022/0290997 | A1 * | 9/2022 | Cserna | G01C 21/32 |
| 2024/0402725 | A1 * | 12/2024 | Banerjee | B25J 9/1697 |
| 2025/0128734 | A1 * | 4/2025 | Joshi | B60W 60/0015 |
| 2025/0139986 | A1 * | 5/2025 | Kum | G06T 3/4038 |
| 2025/0200283 | A1 * | 6/2025 | Wu | G06V 20/00 |

OTHER PUBLICATIONS

Mi, et al., "HDMapGen: A Hierarchical Graph Generative Model of High Definition Maps", arXiv:2106.14880v1 [cs.CV] Jun. 28, 2021, 14 pages.

Shin, et al., "InstaGraM: Instance-level Graph Modeling for Vectorized HD Map Learning", arXiv:2301.04470v2 [cs.CV] Jun. 22, 2023, 11 pages.

Gao, et al., "VectorNet: Encoding HD Maps and Agent Dynamics from Vectorized Representation", arXiv:2005.04259v1 [cs.CV] May 8, 2020, 9 pages.

* cited by examiner

SYSTEM AND METHOD FOR COMPRESSED HIGH-DEFINITION (HD) MAP GENERATION

TECHNICAL FIELD

This disclosure relates generally to high-definition (HD) map generation, and in particular relates to compressed HD map generation.

BACKGROUND

To navigate an autonomous vehicle or a robot, we may rely on sensors such as LiDAR, camera, radar, GPS, inertial motion unit (IMU) along with a base map. Traditionally a base map, also known as a vector map, contains lane level information as well as road level information such as traffic signs, slope and road curvature, road and speed restrictions, etc., with a precision of up-to a few meters, which are useful to capture static information of the environment. However, for precise navigation of an autonomous vehicle, it may be beneficial to capture both static and dynamic environment information (e.g., environment localization, semantic scene understanding, textual inferences, road obstructions), which can be generated by constructing an HD map, by fusion of multiple sensors along with the base map, thereby generating a highly accurate map with centimeter-level precision.

However, generation of such an HD map, may require a fleet of vehicles for every region of interest, which may lead to capturing overlapping features of both the static and dynamic environments, thereby leading to duplicate features being present in the final map. Assuming a lossless overlap is performed such that there are no overlapping regions, however, this does not solve the issues that these fleets of vehicles often generate very large sizes of HD maps, often reaching couple of terabytes (TBs) per day. Moreover, there are techniques which generate HD vectorized map containing semantic information of different images and point cloud data, but often fail to generalize across various regions, as the machine-learning models are trained on a specific distribution of data, often demonstrating weak robustness to out-of-distribution samples, thereby making it bound to a specific region of interest. Furthermore, most of these HD maps are located centrally on a cloud or a on-premises server. Although there are techniques where partial maps of a region can be loaded along with extra metadata, these dynamic features may be outdated, thereby requiring autonomous vehicles to perform more complex navigation strategies. In vehicles/robots which require computing such information on an edge computing device, using a map comprising of multiple layers, requires more computation power to perform inferencing as well as annotating such a dense map requires complex annotation strategies, which induces annotation cost.

DESCRIPTION OF EXAMPLE EMBODIMENTS

Compressed High-Definition (HD) Map Generation

Figure 1:
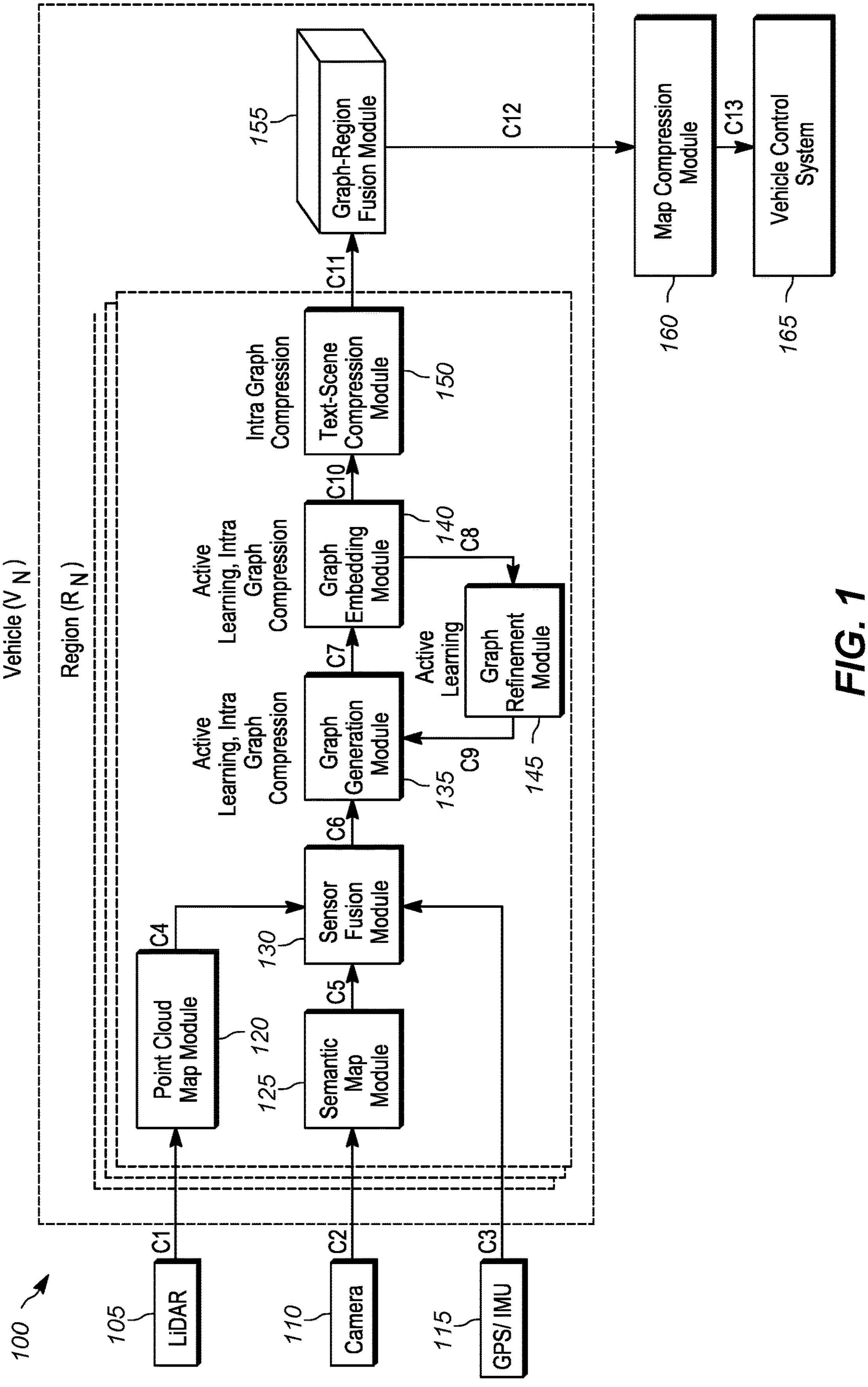
FIG. 1 illustrates an example system for generating compressed HD maps using reconfigurable graph-map network with long-term graph embeddings.

In particular embodiments, an electronic device may generate HD maps by compressing overall map size across regions. The generation of HD maps may incorporate reconfigurable graph-map network with long-term graph embeddings. Furthermore, the electronic device may construct various nodes and edges across different regions of interests for each vehicle and ensure information across various overlapping regions of multiple vehicles are preserved. The embodiments disclosed herein may be robust to out-of-distribution changes to graph edges. Such information may be later stored as a refined map layer, which can be further used by an autonomous vehicle for navigation. Although this disclosure describes generating particular maps by particular devices in a particular manner, this disclosure contemplates generating any suitable map by any suitable device in any suitable manner.

In particular embodiments, the electronic device may access sensor data captured by one or more mobile devices operating in a plurality of regions in an environment. The one or more mobile devices may include one or more of a vehicle, a robot, a drone, a robotic vacuum, a robotic mop, or any suitable mobile device. The electronic device may then generate, for each of the plurality regions, a plurality of graph embeddings associated with each of the mobile devices based on a compressed graph associated with each of the mobile devices constructed from the sensor data. In particular embodiments, the compressed graph may comprise a plurality of nodes and a plurality of compressed edges connecting the nodes across a plurality of layers. The electronic device may then generate, for each of the plurality of regions based on the plurality of graph embeddings associated with each of the mobile devices, a refined graph associated with each of the mobile devices by reconfiguring one or more edges of the plurality of compressed edges across the plurality of layers in the compressed graph associated with each of the mobile devices. In particular embodiments, the electronic device may generate a graph high-definition (HD) map associated with each of the mobile devices based on a fusion of the plurality of refined graphs associated with the plurality of regions for each of the mobile devices. The electronic device may then identify, based on the graph HD map associated with each of the mobile devices, a plurality of prominent nodes and a plurality of prominent edges connecting the prominent nodes based on trace activations associated with the prominent edges. The electronic device may further generate a compressed graph HD map for the environment based on the prominent nodes and prominent edges associated with the one or more mobile devices and environmental information associated with the environment.

Certain technical challenges exist for generating compressed HD maps. One technical challenge may include refining the graph generated by multi-edge tree construction from the sensor data. The solution presented by the embodiments disclosed herein to address this challenge may be constructing and reconfiguring local graph nodes and edges based on out-of-distribution and active learning approach as the out-of-distribution and active learning approach can learn different sub-graphs from different surrounding environment, which are then reconfigured. Another technical challenge may include supporting robustness of the HD map and generalizability. The solution presented by the embodiments disclosed herein to address this challenge may be using trace activation and surprise adequacy to extract prominent reconfigured edges and nodes, as these nodes and edges may contain primary level, secondary level and tertiary level extraction of the features and information of the surrounding environment.

Certain embodiments disclosed herein may provide one or more technical advantages. A technical advantage of the embodiments may include improved computational efficiency due to the compressed global graph HD map, which is superior to standard vectorized HD maps. Another technical advantage of the embodiments may include preserving generalizability across regions and vehicles as the compressed global graph HD map is generated by fusing graph HD maps associated with different regions and different vehicles. Another technical advantage of the embodiments may include the compressed global graph HD map containing information and features of semantic map generated from images and/or point cloud map information generated from point cloud data as the semantic map and point cloud map are used to generate the scene graph which is further used for generating the compressed global graph HD map. Another technical advantage of the embodiments may include preserved joint attention of textual inferences across local graph maps across each region as a text-scene transformer is used to preserve the joint attention before fusing multiple regional graphs to a global graph network. Another technical advantage may include achieving compressed global graph HD map by using intra-graph compression between the graph generation and graph embedding generation as intra-graph compression can directly help achieve compressed global graph HD map by keeping robust edges. Certain embodiments disclosed herein may provide none, some, or all of the above technical advantages. One or more other technical advantages may be readily apparent to one skilled in the art in view of the figures, descriptions, and claims of the present disclosure.

FIG. 1 illustrates an example system 100 for generating compressed HD maps using reconfigurable graph-map network with long-term graph embeddings. The example system 100 may include LiDAR sensor 105, camera sensor 110, GPS/IMU 115, point cloud map module 120, semantic map module 125, sensor fusion module 130, graph generation module 135, graph embedding module 140, graph refinement module 145, text-scene compression module 150, graph-region fusion module 155, map compression module 160, and vehicle control system 165. In particular embodiments, the example system 100 may incorporate at least a processor, a memory which includes a volatile memory such as a random-access memory (RAM) and a computer-readable medium or article. The memory may store a set of instruction or algorithm, which may be executed by at least a processor in accordance with certain embodiments. The example system 100 may be implemented in a variety of miniature computing systems, such as robots, bots, autonomous vehicles, servers, as well as environment sensors such as LiDAR, camera, GPS/IMU, radar, event driven sensors, etc. The example system 100 may be adapted to exchange data with other components or service providers using a wide area network/Internet. Possible systems on which the example system 100 may be implemented may include groups of automated guided vehicles, autonomous driving vehicles, robots, and bots, etc. Table 1 list the connections/interfaces between different components with corresponding descriptions for the example system 100. The connection/interface denotes that a hardware/software based module of the example system may be directly connected to or indirectly connected through one or more intermediate components.

TABLE 1

Connections/Interfaces with their descriptions illustrating components of the system.

| Connection/ Interface | Descriptions |
|---|---|
| "C1" | "C1" connector is used to send the LiDAR point cloud data of the surrounding environment to Point Cloud Map Module for processing. |
| "C2" | "C2" connector is used to send the RGB camera (stereo/mono) images of the surrounding environment to Semantic Map Module for processing. |
| "C3" | "C3" connector is used to send the GPS/IMU data to perform sensor fusion. |
| "C4" | "C4" connector is used to get the point cloud map generated by aggregating multiple point cloud sweeps and often is generated by a neural network machine learning algorithm, which is then passed to Sensor Fusion Module. |
| "C5" | "C5" connector is used to get the semantic map generated by performing semantic segmentation of the surrounding environment, using a neural network machine-learning algorithm, which is then passed to Sensor Fusion Module. |
| "C6" | "C6" connector is used to get the sensor fused map from Sensor Fusion Module and feed it to the Graph Generation Module where graph generation is performed by multi-edge tree construction per layer per region. |

TABLE 1-continued

Connections/Interfaces with their descriptions illustrating components of the system.

| Connection/ Interface | Descriptions |
|---|---|
| "C7" | "C7" connector is used to get the generated graph from Graph Generation Module and is fed to the Graph Embedding Module, which generates graph embeddings using images and point cloud data from compressed edges per region. |
| "C8" | "C8" connector is used to get the graph embeddings per region and send it to the Graph Refinement Module which refines graph by constructing and reconfiguring new edges based on active learning and out-of-distribution per region. |
| "C9" | "C9" connector is used to get the refined graph from Graph Refinement Module and based on the active learning strategy. This refined graph is further passed to the Graph Generation Module, where this iteration is continued for several iterations, till robustness and convergence is achieved from the graph network. |
| "C10" | "C10" connector is used to get the graph embeddings per region after reconfiguration and refinement and is sent to the Text-Scene Compression Module where text-attributes and graph embeddings are fused and token quantization is performed as a compression of the graph-map. |
| "C11" | "C11" connector is used to get the joint attention per region and is fed to the Graph-Region Fusion Module where multiple graph embeddings per region with their corresponding joint attention from texts are interleaved and fused across regions, to generate penultimate graph map per vehicle across regions. |
| "C12" | "C12" connector is used to get the graph map after Graph-Region Fusion and it fed to Map Compression Module where highest trace activations per vehicle are extracted from its nodes and edges to generate global graph map. This global graph map is then fused with the static environment and dynamic environment to generate a final HD graph map. |
| "C13" | "C13" connector is used to get the final HD graph map from Map Compression Module and is fed to Vehicle Control System for further processing, which can be used for navigation, steering, control, planning, etc. |

In particular embodiments, the one or more mobile devices may be one or more vehicles. Accordingly, the sensor data may comprise one or more of LiDAR data, image data, GPS data, inertial-measurement-unit (IMU) data, or radar data. In particular embodiments, the electronic device may make use of environment sensors such as LiDAR 105, RGB camera 110 (stereo/mono), GPS/IMU 115 to generate a HD map. It should be noted that although FIG. 1 includes LiDAR 105, RGB camera 110 (stereo/mono), GPS/IMU 115 as the used sensors, the sensors that the computing system may use are not limited to these sensors.

In particular embodiments, the point cloud data may be captured from the LiDAR sensor 105 and passed to the point cloud map module 120. The point cloud map module 120 may construct a point cloud map by aggregating multiple scans/sweeps of the LiDAR sensor 105, either by using only the LiDAR sensor 105 or by using the GPS/IMU 115 to generate a localized and calibrated point cloud map.

In particular embodiments, images may be captured from the RGB camera 110 (stereo/mono) and further sent to the semantic map module 125. The semantic map module 125 may use a semantic-segmentation neural network to construct a semantic map of the environment, often grouping together multiple objects such as cars, pedestrians, roads, traffic lights, traffic signs, etc.

In particular embodiments, the sensor fusion module 130 may combine the point cloud map and semantic map with the GPS/IMU data 115 captured from the vehicle/robot to generate a sensor fused map. The sensor fused map may primarily comprise overlapping features and regions. In particular embodiments, the sensor fused map may include both static and dynamic information of the environment. The static information of the environment may include road-level information such as traffic signs, slopes and road curvatures, road and speed restrictions while the dynamic information may include vehicle localization, semantic scene understanding, textual inferences, road obstructions, etc.

In particular embodiments, the sensor fused map may be sent to the graph generation module 135. The graph generation module 135 may construct a multi-edge graph per layer, per region of the vehicle to capture information while performing intra-graph compression. The generated graph, from both the point cloud and images may be further sent to the graph embedding module 140. In particular embodiments, the graph embedding module 140 may generate graph embeddings using compressed edges per region, while performing intra-graph compression and trace activations of the nodes, thereby affecting the edges.

In particular embodiments, the graph embeddings may be refined by a graph refinement module 145. The graph refine module 140 may construct and reconfigure new edges based on active learning and out-of-distribution trace-activation per region of the vehicle. The reconfigurable edges within the graph may ensure high robustness to new regions as well as different vehicles.

In particular embodiments, the refined graph may be then sent to the text-scene compression module 150. The text-scene compression module 150 may incorporate a conventional text encoder-decoder transformer as well as graph embeddings to generate text-graph correspondences with token quantization, which compresses the graph map as well as joint attention per region. In particular embodiments, the joint attention per region may be determined by the conventional transformer.

In particular embodiments, the output from the text-scene compression module 150 may be sent to the graph-region fusion module 155. The graph-region fusion module 155 may fuse multiple graph maps from various regions of a vehicle with different latent representation and eventually generate a local HD map per vehicle. The local HD map may be further sent to the map compression module 160 to generate a final global graph HD map. In particular embodiments, the vehicle control system 165 may use the final global HD map together with other static and dynamic information to perform autonomous navigation and control.

Figure 2:
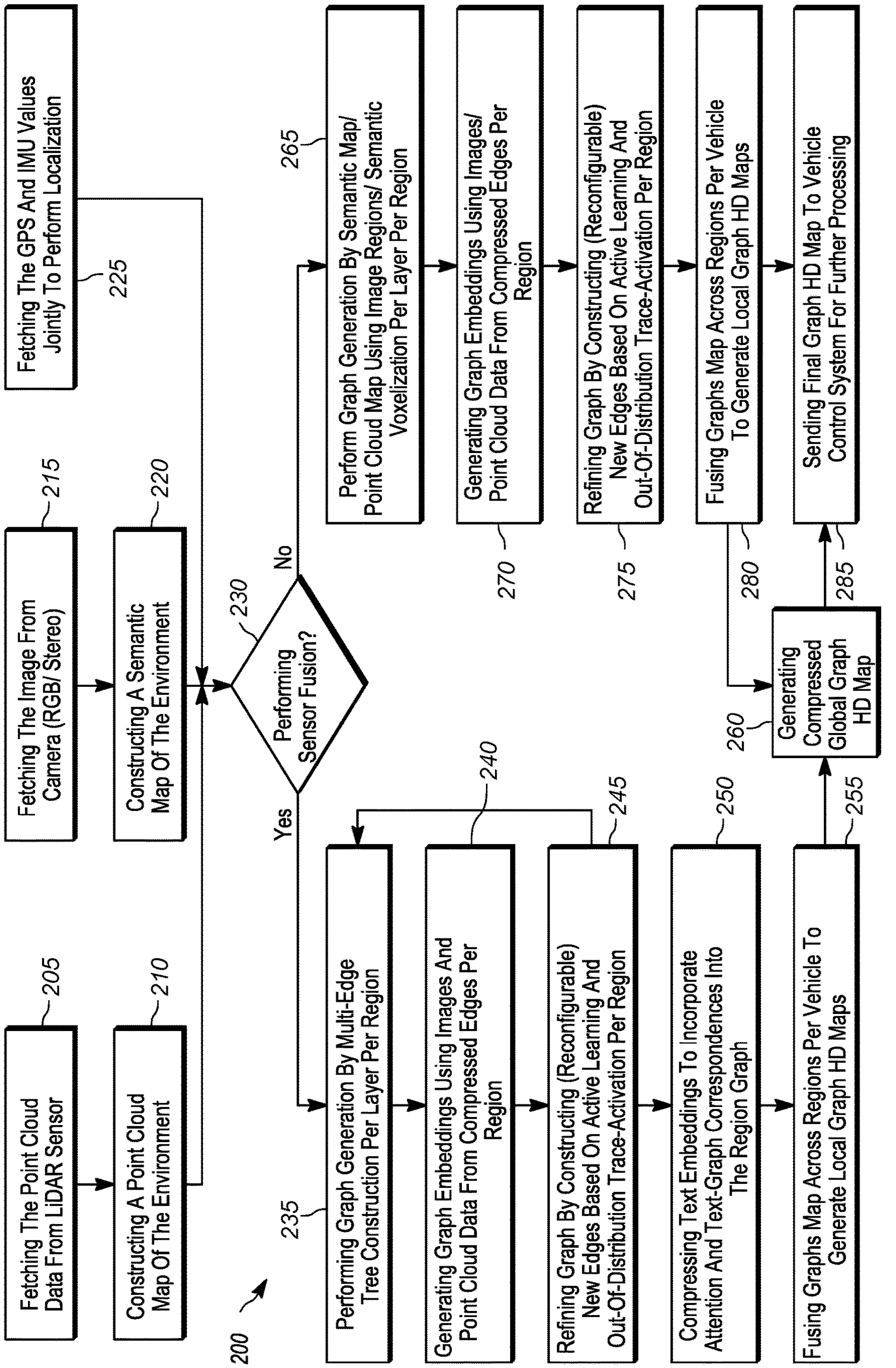
FIG. 2 illustrates an example diagram for compressed HD map generation using reconfigurable graph-map network with long-term graph embeddings.

FIG. 2 illustrates an example diagram 200 for compressed HD map generation using reconfigurable graph-map network with long-term graph embeddings. As described above, the example system 100 may comprise multiple modules. The overall flow of the example system 100 is illustrated in FIG. 2. At step 205, a computing system may fetch the point cloud data from LiDAR sensor. At step 210, the computing system may construct a point cloud map of the surrounding environment. Sequential or parallel to step 205, the computing system may fetch the images from camera (RGB/stereo) at step 215. At step 220, the computing system may construct a semantic map of the surrounding environment. To perform environment localization accurately, the computing system may fetch the GPS/IMU data from the vehicle/robot at step 225. In particular embodiments, fetching the GPS/IMU data may be after the point cloud map or semantic map is constructed. In alternative embodiments, the GPS/IMU data may fused during the construction of the point cloud map or semantic map.

At step 230, the computing system may determine whether a sensor fusion is performed. If a sensor fusion is performed on the example system 100, i.e., utilizing multiple environment sensors, the computing system may perform graph generation by multi-edge tree construction per layer and per region at step 235. Once a graph of the environment is generated from images and point cloud data, the computing system may generate graph embeddings using images and point cloud data from compressed edges per region at step 240. As a result, the embodiments disclosed herein may have a technical advantage of the compressed global graph HD map containing information and features of semantic map generated from images and/or point cloud map information generated from point cloud data as the semantic map and point cloud map are used to generate the scene graph which is further used for generating the compressed global graph HD map.

At step 245, the computing system may refine graph by constructing and reconfiguring new edges based on active learning and out-of-distribution trace activations per region. At step 250, the computing system may compress text embeddings and merge the compressed text embeddings with graph embeddings per region to incorporate join attention and text-graph correspondences into the region graph. At step 255, the computing system may fuse graph maps across regions per vehicle to generate local graph HD maps. At step 260, the computing system may further fuse the local graph HD maps associated with multiple vehicles for map compression to generate a final compressed global HD map.

If a sensor fusion is not performed on the example system 100, the computing system may perform graph generation based on semantic map or point cloud map using image regions or semantic voxelization per layer per region at step 265. At step 270, the computing system may generate graph embeddings using images or point cloud data from compressed edges per region. At step 275, the computing system may refine graph by constructing and reconfiguring new edges based on active learning and out-of-distribution trace activations per region. At step 280, the computing system may fuse graph maps across regions per vehicle to generate local graph HD maps. The example diagram 200 may then proceed to step 260 to generate the final compressed global HD map. At step 285, the computing system may send the final compressed global HD graph map to vehicle control system for further processing.

Figure 3:
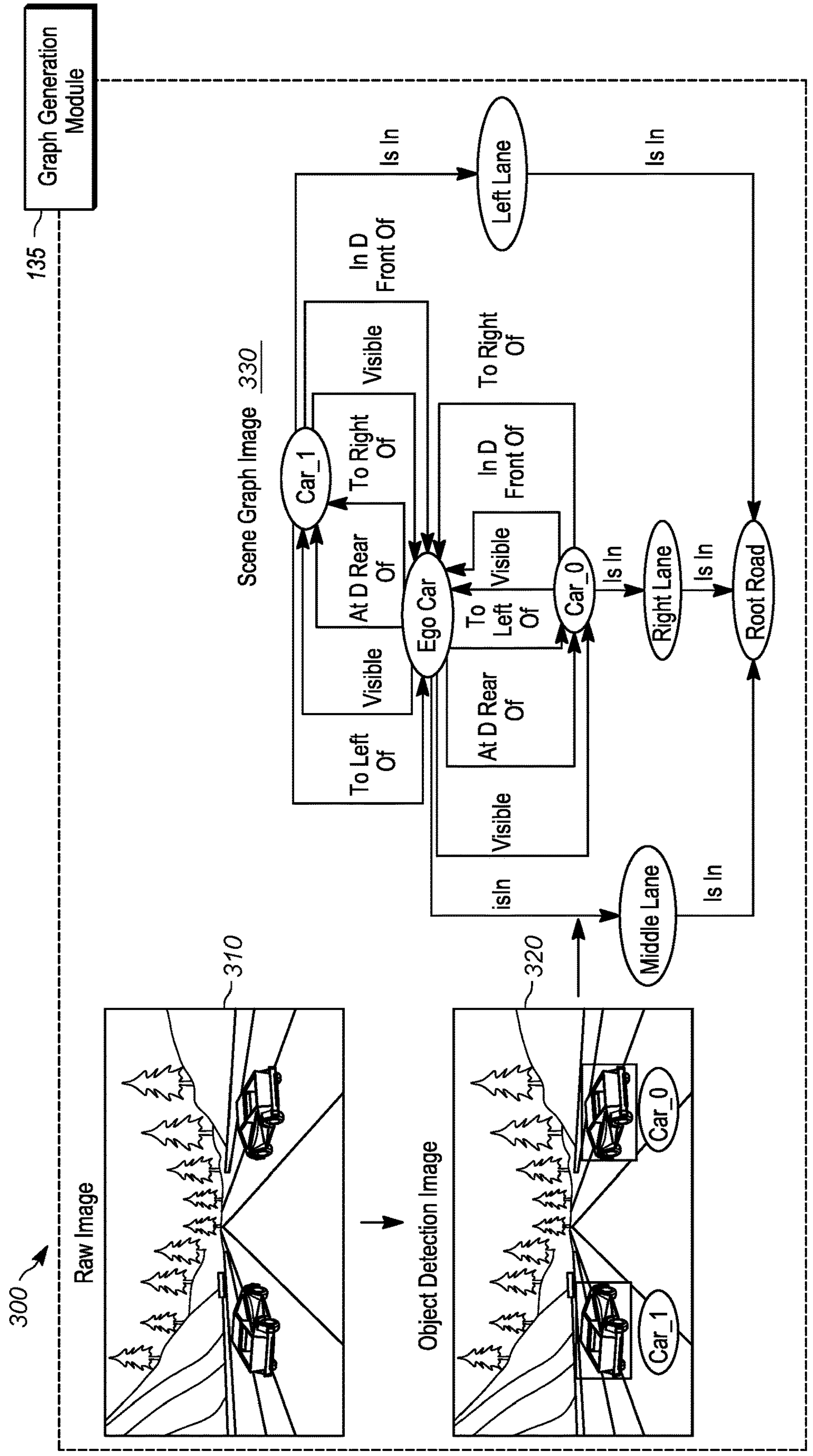
FIG. 3 illustrates an example flow diagram for performing graph generation by multi-edge tree construction per layer per region by the graph generation module.

FIG. 3 illustrates an example flow diagram 300 for performing graph generation by multi-edge tree construction per layer per region by the graph generation module 135. In particular embodiments, the electronic device may generate the compressed graph associated with each of the mobile devices. The generation may comprise generating, for each of the plurality regions based on the sensor data, a graph multi-edge tree comprising the plurality of nodes and a plurality of edges connecting the nodes across the plurality of layers. In particular embodiments, the plurality of nodes may correspond to a plurality of objects in the region. One or more of the nodes may be connected by one or more of the edges in each of the layers. The one or more edges in each of the layers may represent a respective level of relationship between the one or more nodes in that layer. In particular embodiment, the level of relationship may comprise one or more of a primary relationship, a secondary relationship, or a tertiary relationship. The generation may further comprise generating, for each of the plurality of regions, the compressed graph multi-edge tree from the corresponding graph multi-edge tree by extracting a plurality of high-activating edges across the plurality of layers from the graph multi-edge tree. In particular embodiments, the compressed graph multi-edge tree may comprise the plurality of compressed edges comprising the plurality of high-activating edges across the plurality of layers.

In particular embodiments, the sensor fused output from both images and point cloud data may be first used to extract key nodes or objects from the surrounding environment. As an example and not by way of limitation, based on a raw image 310 for the surround environment, the graph generation module 135 may detect objects including Car_0 and Car_1, as depicted in the object detection image 320. In particular embodiments, extracting the key nodes or objects may be based on the information from the point cloud map and semantic image map.

In the graph generation process, edges may be constructed based on the primary relationship in the tree structure such that each node may comprise multiple sub-trees or paths. In particular embodiments, the sub-trees or paths may represent contextual information of the environment and embed higher-level information. The graph generation process may be aggregated with increasing number of layers of the graph. In particular embodiments, each layer may represent secondary relationship, tertiary relationship, etc., per region of the graph. Furthermore, once a graph multi-edge tree is constructed comprising multi-level relationship between nodes and edges, a graph pruning process may be applied. In particular embodiments, the graph generation module 135 may perform the graph pruning process by utilizing a graph optimization algorithm to extract high activating edges from less activating edges. As the graph generation may be an iterative process which depends on the feedback from the graph refinement module 145, a final scene graph utilizing both image and point cloud data may be constructed. As an example and not by way of limitation, FIG. 3 shows an example scene graph image 330.

Figure 4:
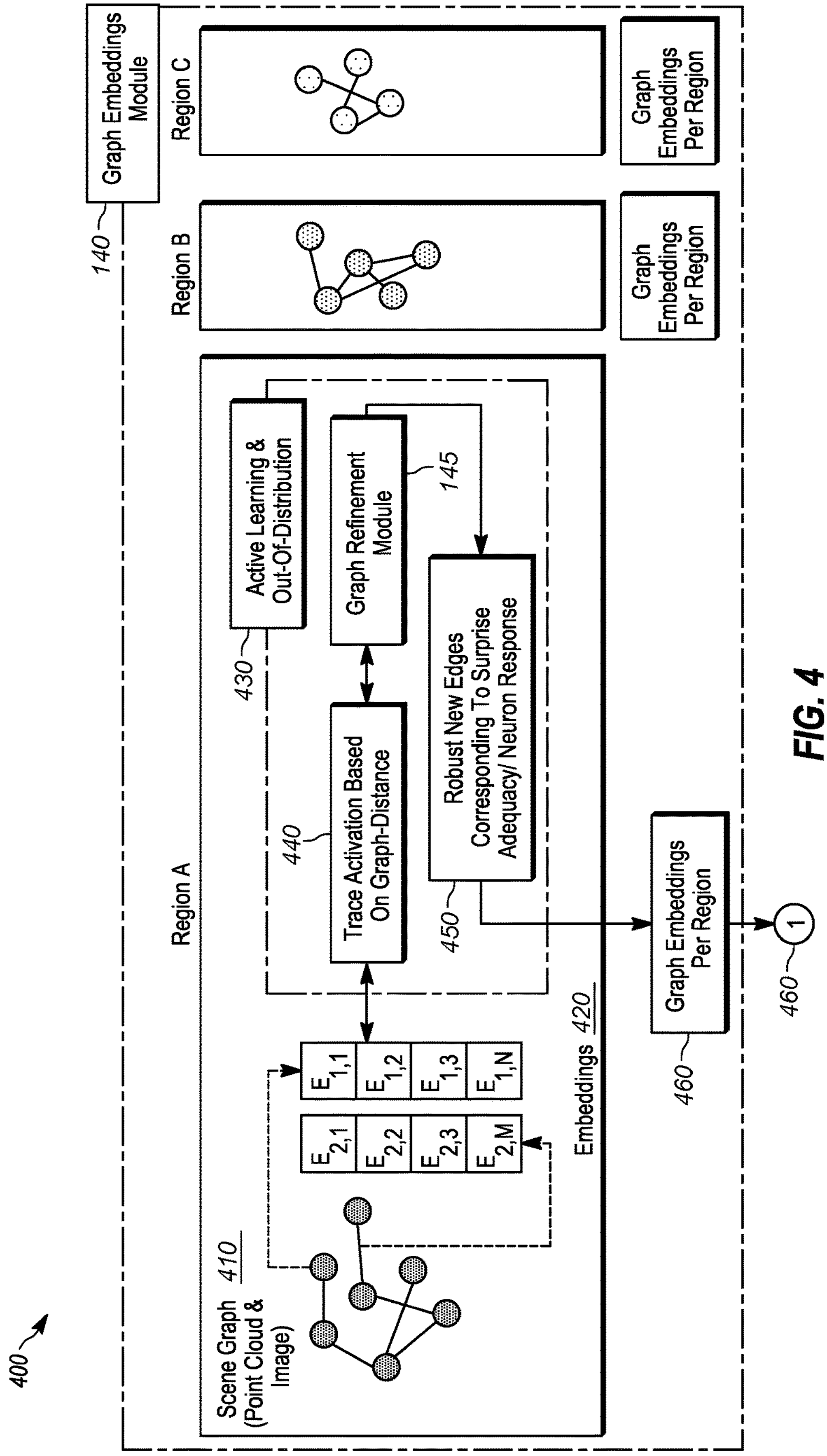
FIG. 4 illustrates an example flow diagram for generating graph embeddings using images and point cloud data from compressed edges per region.

FIG. 4 illustrates an example flow diagram 400 for generating graph embeddings using images and point cloud data from compressed edges per region. In particular embodiments, each of the plurality of graph embeddings associated with each of the mobile devices may comprise one or more of edge-level vector information or node-level vector information. Each of the plurality of graph embeddings may be reconfigurable. In addition, each of the plurality of graph embeddings may be associated with a dynamic vector length.

In particular embodiments, the scene graph 410 constructed from both images and point cloud data may comprise edge-level vector information as well as node-level vector information, which is referred to graph embeddings 420. In particular embodiments, these embeddings may be reconfigurable as well as having dynamic vector length. Using such dynamic and reconfigurable graph connection may help in achieving high generalizability across multiple regions and across different vehicles with different surrounding environments.

These graph embeddings 420 may be further subjected to active learning and out-of-distribution strategy 430. In particular embodiments, the active learning and out-of-distribution strategy 430 may comprise firstly calculating the trace activation based on graph distance 440. In other words, the electronic device may calculate, based on one or more of an active learning model or an out-of-distribution model, a plurality of trace activations for the plurality of graph embeddings associated with each of the mobile devices based on one or more of a distance metric or a quantitative similarity measure. As an example and not by way of limitation, the graph distance may be based on standard distances, such as Euclidean or Mahalanobis distances. In alternative embodiments, calculating the trace activation may be based on using surprise adequacy to measure the histogram of different activations of neurons with different environment inputs. In particular embodiments, the threshold of trace activation during surprise adequacy may be dynamically calculated based on the scene graph 410 of a specific region. After convergence, this threshold may be generalized across different regions. The generalized threshold may be then sent to the graph refinement module 145. The embodiments disclosed herein may have a technical advantage of achieving compressed global graph HD map by using intra-graph compression between the graph generation and graph embedding generation as intra-graph compression can directly help achieve compressed global graph HD map by keeping robust edges.

In particular embodiments, the graph refinement module 145 may construct and reconfigure new edges 450 during the feedback of the graph model. Subsequently, these robust edges 450 may correspond to the surprise adequacy or neuron response of the graph model. The output from the active learning and out-of-distribution strategy 430 may include the graph embeddings per region 460, which may be then sent to graph refinement module 145 for further processing. In particular embodiments, generating the refined graph associated with each of the mobile devices for each of the plurality of regions may be further based on the plurality of trace activations.

Figure 5:
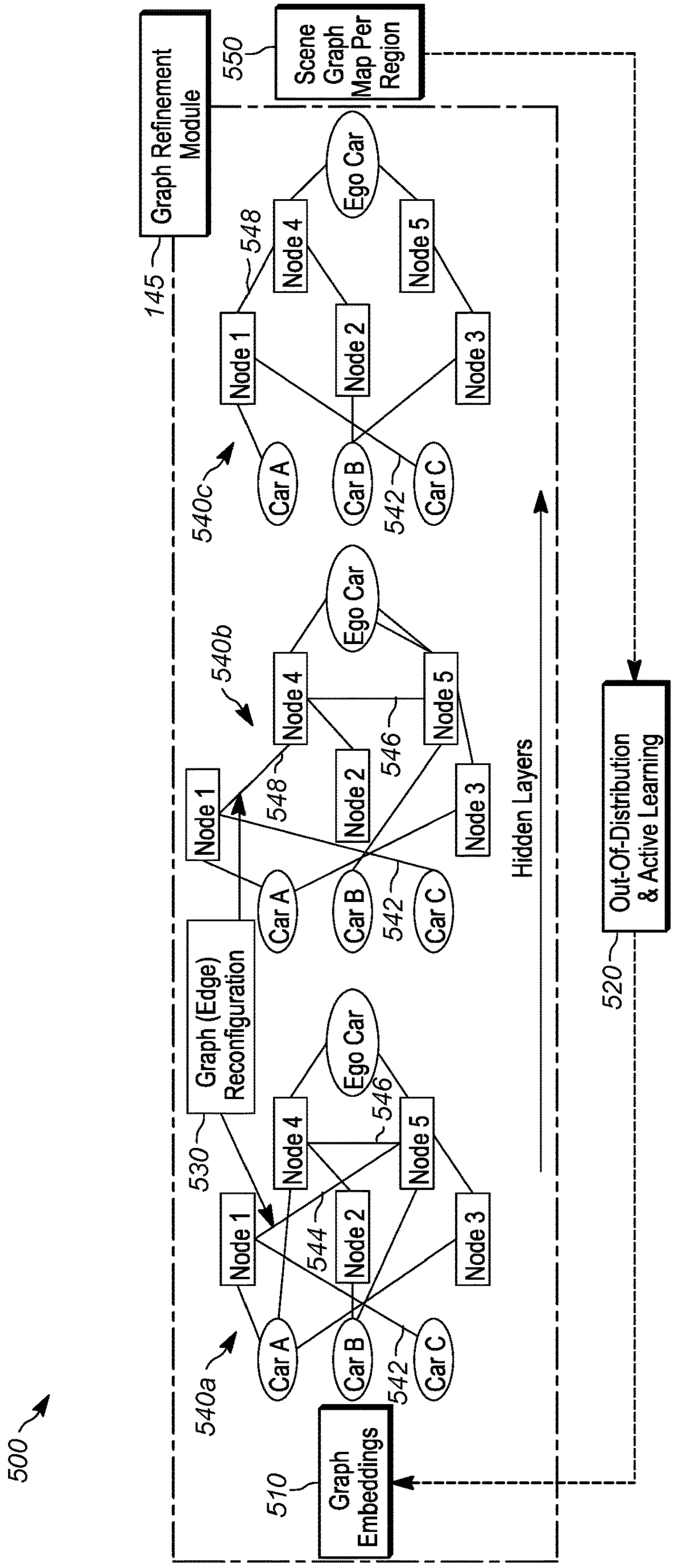
FIG. 5 illustrates an example flow diagram for refining the graph by constructing and reconfiguring new edges based on active learning and out-of-distribution trace-activation per region.

FIG. 5 illustrates an example flow diagram 500 for refining the graph by constructing and reconfiguring new edges based on active learning and out-of-distribution trace-activation per region. In particular embodiments, the output from the graph embedding module 140 which generates compressed edges per region in the graph map may be fed to the graph refinement module 145 to perform edge reconfiguration. The graph embeddings 510 may contain trace activations from different nodes and edges with embedding vectors, which may be all part of the graph map. Based on the out-of-distribution and active learning (AL) strategy 520 of the graph network, the reconfiguration 530 of multiple edges may take place from the output of the graph generation module 135. As described previously, the output from the graph generation module 135 may include various primary-level, secondary-level and tertiary-level relationships. The edges being compressed based on trace activation using surprise adequacy of different neurons may result in multiple sub-graphs 540. In particular embodiments, the sub-graphs 540 may be then reconfigured as the number of hidden layers is increased in the graph network. Using trace activation and surprise adequacy to extract prominent reconfigured edges and nodes may be an effective solution for addressing the technical challenge of supporting robustness of the HD map and generalizability as these nodes and edges may contain primary level, secondary level and tertiary level extraction of the features and information of the surrounding environment.

In FIG. 5, edge 542, edge 544, edge 546 in sub-graph 540*a* may be seen as reconfigured as the surrounding of the environment changes per region of the vehicle. For example, these edges may be reconfigured as edge 542, edge 546, and edge 548 in sub-graph 540*b*, and further reconfigured as edge 542 and edge 548 in sub-graph 540*c*. Finally, this results in a scene graph 550 which may be continuously reconfigured as the feedback loop of the system reaching a convergence on the graph model. In particular embodiments, the process of trace activation using surprise adequacy may be used to determine the out-of-distribution (OOD) of the system by learning different graph representation from different surrounding environment per region of the vehicle. Constructing and reconfiguring local graph nodes and edges based on out-of-distribution and active learning approach may be an effective solution for addressing the technical challenge of refining the graph generated by multi-edge tree construction from the sensor data as the out-of-distribution and active learning approach can learn different sub-graphs from different surrounding environment, which are then reconfigured.

Figure 6:
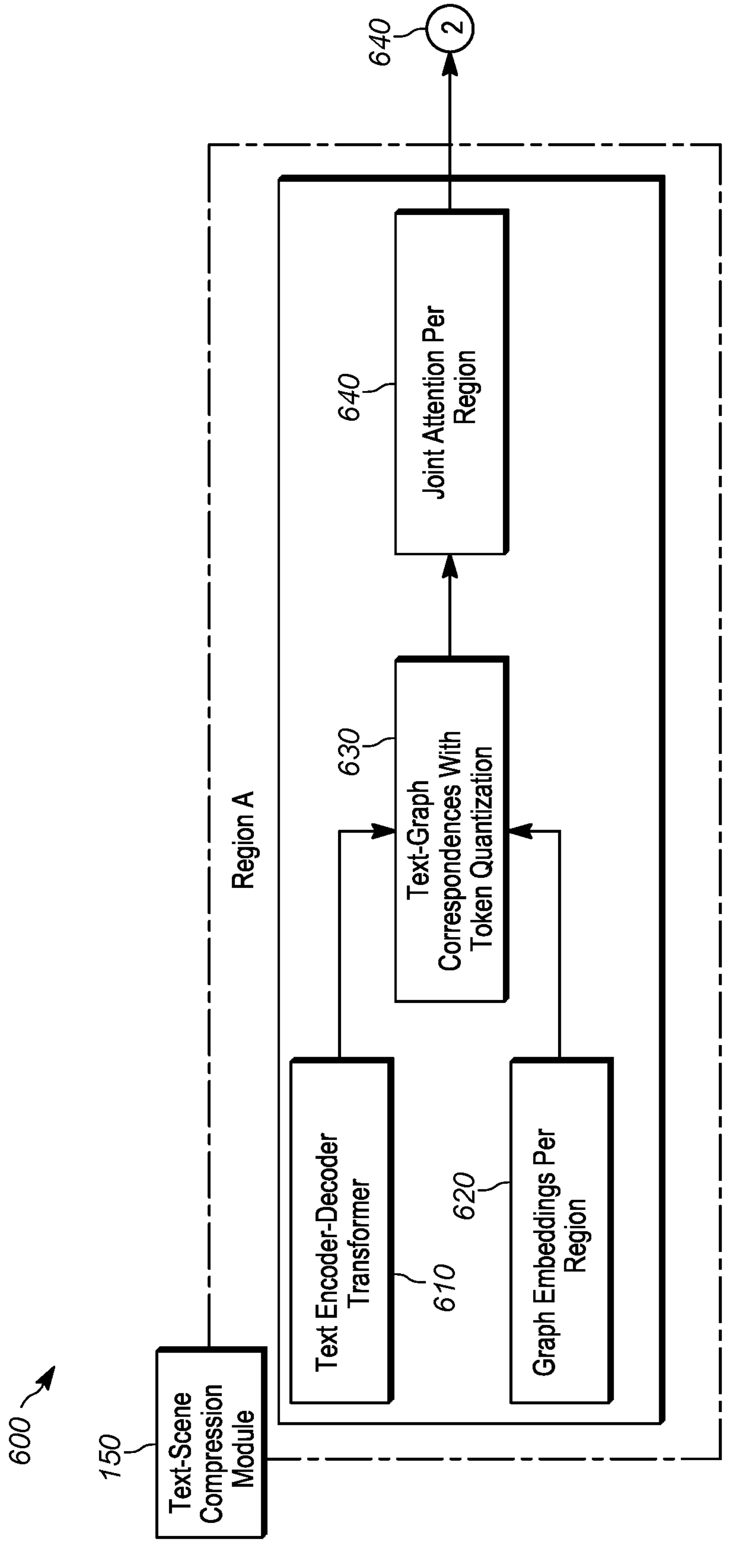
FIG. 6 illustrates an example flow diagram for compressing text attributes to incorporate attention, text-graph correspondences, and token quantization into a region graph.

FIG. 6 illustrates an example flow diagram 600 for compressing text attributes to incorporate attention, text-graph correspondences, and token quantization into a region graph. In particular embodiments, text embeddings along with graph embeddings may be fused to incorporate attention as well as to preserve the long-term graph embeddings. In particular embodiments, the electronic device may detect text information associated with each of the mobile devices from the environment. The electronic device may then generate, based on the text information, a plurality of text tokens. As illustrated in FIG. 6, a text-based encoder-decoder transformer 610 may be used with input tokens that are extracted from the surrounding environment.

In particular embodiments, the electronic device may further determine a plurality of text-graph correspondences indicating a plurality of mappings between one or more of the graph embeddings and one or more of the text tokens. Since the textual context information is fused with graph embeddings 620 after refinement and after convergence of the graph network, text-graph correspondences 630 may be established. The text-graph correspondences 630 may ensure that mappings between graph nodes embedding vectors and text attributes (e.g., positional encodings) and mappings between graph edges embedding vectors and text attributes (e.g., positional encodings) are established. The text-graph correspondences 630 may also ensure that mappings between graph nodes embedding vectors and cross attention amongst the textual tokens and mappings between graph edges embedding vectors and cross attention are established.

In particular embodiments, the electronic device may determine, for each of the plurality regions, a joint attention associated with each of the mobile devices based on the plurality of text-graph correspondences. With the help of transformer-based approach, a joint attention per region 640 per vehicle may be also established.

In particular embodiments, the electronic device may determine a token quantization to identify one or more of the plurality of text tokens to compress based on a fusion process of the plurality of text tokens and the plurality of graph embeddings associated with each of the mobile devices. The text-scene compression module 150 may utilize a key compression approach which is the process of token quantization. Token quantization may be achieved by directly using the graph embeddings 620, which may preserve the primary, secondary and tertiary information. When fused with a text-graph encoder model, the primary, secondary and tertiary information may help learn the text-graph network a joint representation of each token in multiple layers of the text-graph network. As the model reaches convergence with active learning and out-of-distribution strategy during training, it may help compress the input token. In particular embodiments, the electronic device may identify, based on the identified text tokens to compress, one or more non-prevalent edges of the plurality of compressed edges. The electronic device may further remove the one or more non-prevalent edges from the plurality of compressed edges. As a result, non-prevalent connections between edges may be removed, which may result in forceful and long-term text-graph connections with token quantization. The embodiments disclosed herein may have a technical advantage of preserved joint attention of textual inferences across local graph maps across each region as a text-scene transformer is used to preserve the joint attention before fusing multiple regional graphs to a global graph network.

Figure 7:
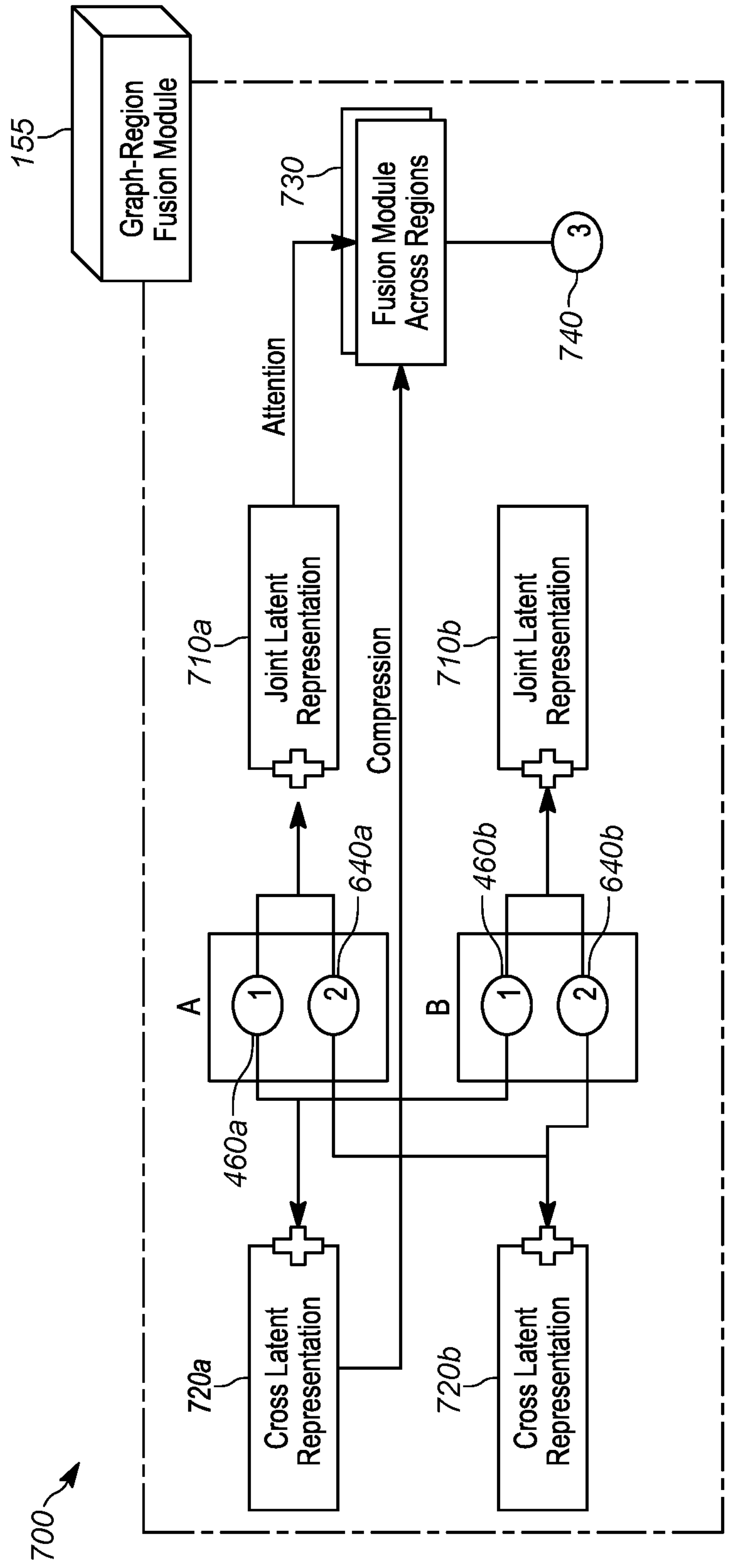
FIG. 7 illustrates an example flow diagram for fusing graph maps across regions per vehicle to general local graph HD maps.

FIG. 7 illustrates an example flow diagram 700 for fusing graph maps across regions per vehicle to general local graph HD maps. In particular embodiments, the electronic device may determine, based on the plurality of graph embeddings associated with each of the mobile devices and the joint attention associated with each of the mobile devices for each of the plurality regions, a joint latent representation associated with each of the mobile devices. The electronic device may also determine, based on the plurality of graph embeddings associated with the plurality of regions and each of the mobile devices, a plurality of first cross latent representations associated with each of the mobile devices. The electronic device may additionally determine, based on the plurality of joint attentions associated with the plurality of regions and each of the mobile devices, a plurality of second cross latent representations associated with each of the mobile devices.

As illustrated in FIG. 7, the outputs from the graph embedding module 145 and text-scene compression module 150 may be used to calculate the joint latent representation 710 and cross latent representation 720. The joint latent representation 710 may be used to generate attention between different nodes and edges of the graph network. The cross latent representation 720 may be used to generate compression between different nodes and edges of the graph network. The joint latent representation 710 may combine the outputs of per region of the vehicle to construct a local graph network representation, which may be useful in the learnability of the graph network. The cross latent representation 720 may combine the outputs of different regions of the vehicle to construct a global graph network representation, which may be useful in the generalizability of the graph network. In particular embodiments, generating the graph HD map based on the fusion of the plurality of refined graphs associated with the plurality of regions for each of the mobile devices may comprise fusing, by a fusion model, the plurality of joint latent representations, the plurality of first cross latent representations, and the plurality of second cross latent representations. As illustrated in FIG. 7, these latent representations may be then fused, e.g., by a fusion module 730, across different regions of the vehicle to produce an overall compressed graph map 740. The overall compressed graph map may be used by any other vehicle, as features and representations are jointly captured in the graph network which preserving generalizability.

Figure 8:
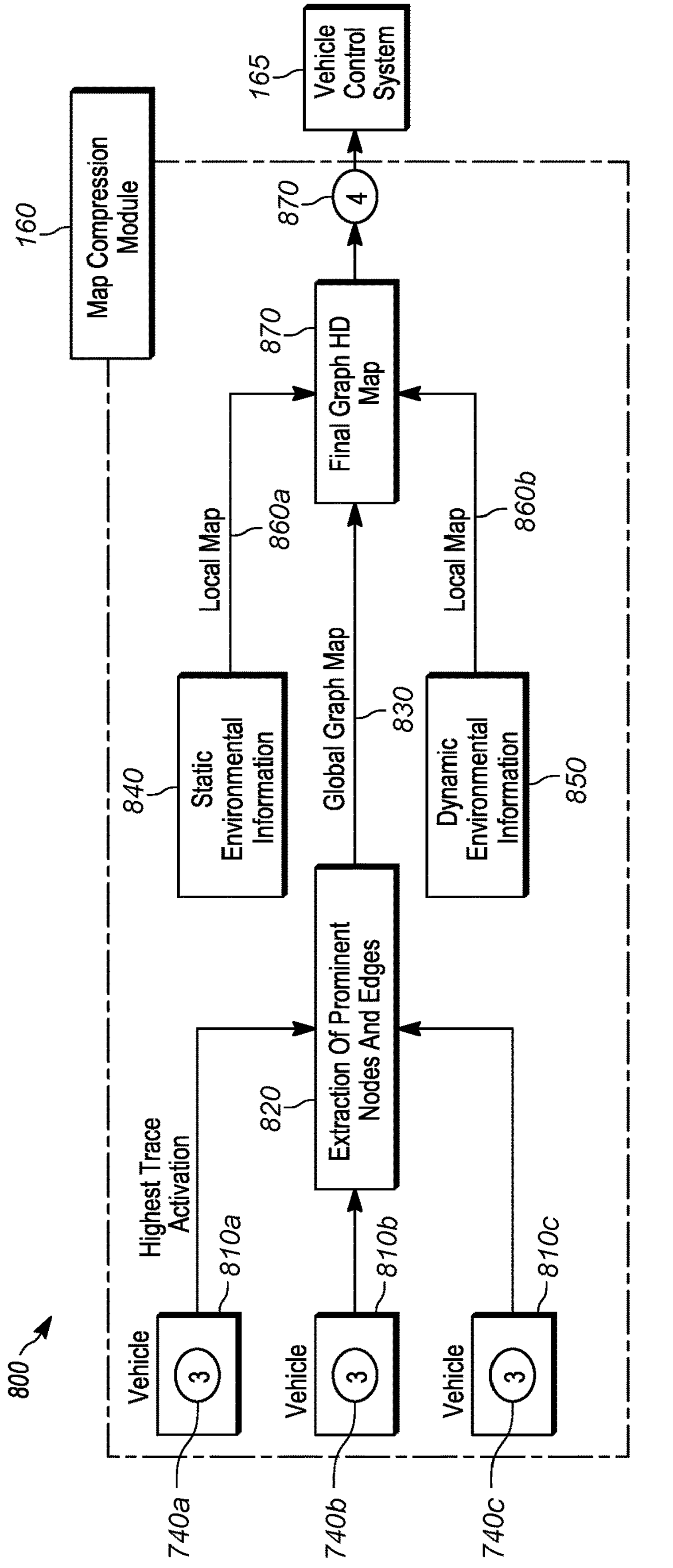
FIG. 8 illustrates an example flow diagram for generating compressed global graph HD maps.

FIG. 8 illustrates an example flow diagram 800 for generating compressed global graph HD maps. In particular embodiments, the output 740 from the graph-region fusion module 155 captured across regions for a vehicle 810 may be firstly processed with graph pruning with the extraction of prominent nodes and edges 820. The pruned graphs from different vehicles may be then fused for the extraction of prominent nodes and edges 820. As a result, the embodiments disclosed herein may have a technical advantage of preserving generalizability across regions and vehicles as the compressed global graph HD map is generated by fusing graph HD maps associated with different regions and different vehicles.

In particular embodiments, the extraction of prominent nodes and edges 820 may comprise identifying the node embedding vectors and edge embedding vectors where trace activations are the highest for a wide array of different environment conditions. The extraction of prominent nodes and edges 820 may further comprise preserving such nodes and edges while pruning other connections, which may result in a compressed HD map. This extraction of prominent nodes and edges may result in a global graph map 830.

In particular embodiments, the one or more mobile devices may be one or more vehicles. In this scenario, the electronic device may determine static environmental information associated with the environment. The static environmental information may comprise one or more of lane information or road-level information. The electronic device may also determine, based on the sensor data, dynamic environmental information associated with the environment. The dynamic environmental information may comprise one or more of environmental localization, scene understanding, textual inference, or road obstruction. Accordingly, the environmental information may comprise the static environmental information and the dynamic environmental information.

As illustrated in FIG. 8, a base map/vector map may comprise information of lanes, road level information, etc, which are usually considered static environment 840 in nature with respect to the environment. Moreover, dynamic environment 850 of the vehicle may be captured. The dynamic environment 850 may include environment localization using environment sensors such as LiDAR, camera, etc, scene understanding algorithms, textual inferences algorithm, road obstruction, etc. The local maps 860 generated from the static environment 840 and dynamic environment 850 may be integrated with the global graph map 830 to generate a final graph HD map 870. A technical advantage of the embodiments may include improved computational efficiency due to the compressed global graph HD map, which is superior to standard vectorized HD maps.

The final graph HD map 870 may be used by the vehicle control system 165 for further processing. In particular embodiments, the one or more mobile devices may be one or more vehicles. The electronic device may execute one or more processing tasks based on the compressed graph HD map. As an example and not by way of limitation, the one or more processing tasks may comprise one or more of navigation, steering, acceleration, or deceleration, or any suitable processing task.

Figure 9:
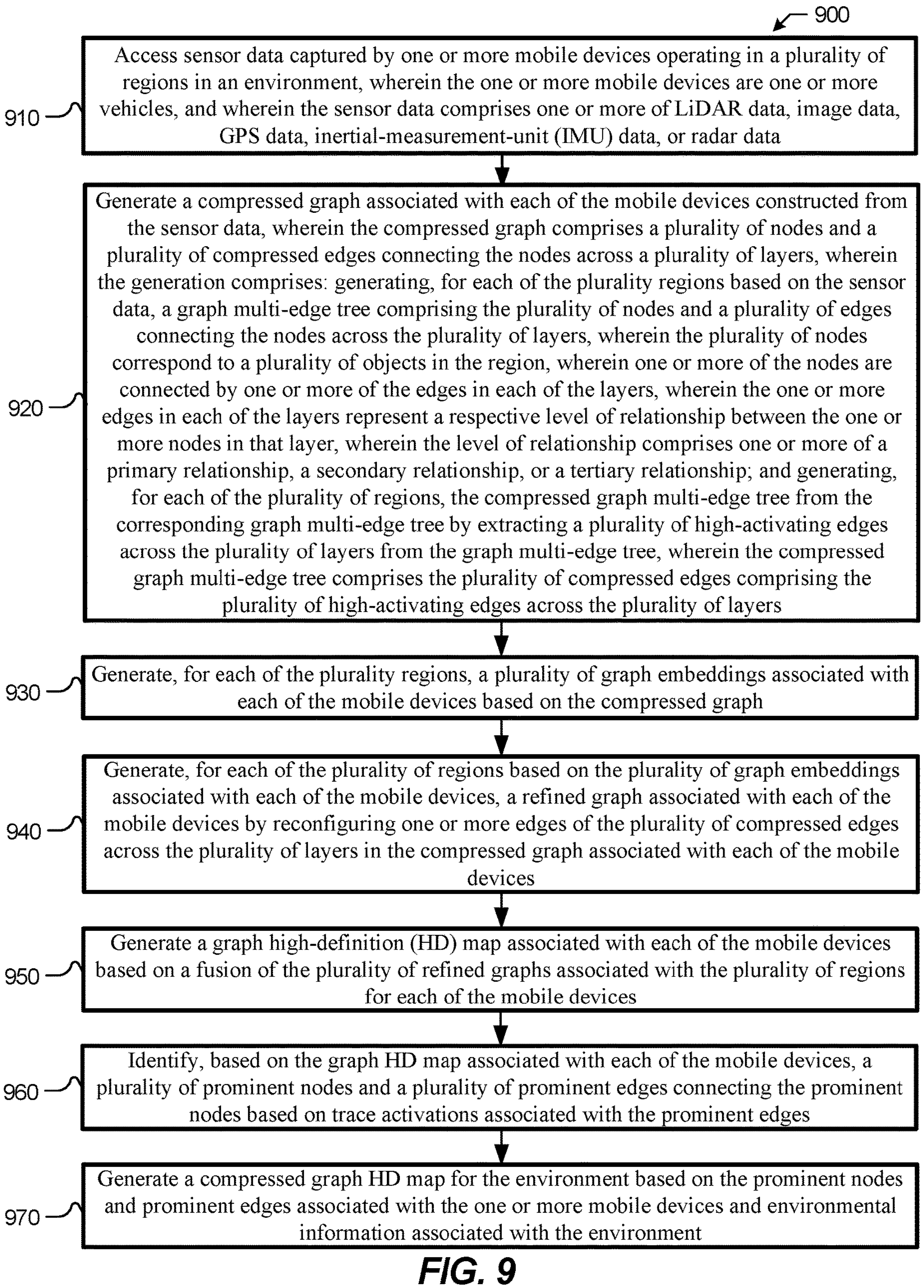
FIG. 9 illustrates is a flow diagram of a method for generating compressed HD maps, in accordance with the presently disclosed embodiments.

FIG. 9 illustrates is a flow diagram of a method 900 for generating compressed HD maps, in accordance with the presently disclosed embodiments. The method 900 may be performed utilizing one or more processing devices (e.g., an electronic device) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), or any other processing device(s) that may be suitable for processing wireless communication data, software (e.g., instructions running/executing on one or more processors), firmware (e.g., microcode), or some combination thereof.

The method 900 may begin at step 910 with the one or more processing devices (e.g., the electronic device). For example, in particular embodiments, the electronic device may access sensor data captured by one or more mobile devices operating in a plurality of regions in an environment, wherein the one or more mobile devices are one or more vehicles, and wherein the sensor data comprises one or more of LiDAR data, image data, GPS data, inertial-measurement-unit (IMU) data, or radar data. The method 900 may then continue at step 920 with the one or more processing devices (e.g., the electronic device). For example, in particular embodiments, the electronic device may generate a compressed graph associated with each of the mobile devices constructed from the sensor data, wherein the compressed graph comprises a plurality of nodes and a plurality of compressed edges connecting the nodes across a plurality of layers, wherein the generation comprises: generating, for each of the plurality regions based on the sensor data, a graph multi-edge tree comprising the plurality of nodes and a plurality of edges connecting the nodes across the plurality of layers, wherein the plurality of nodes correspond to a plurality of objects in the region, wherein one or more of the nodes are connected by one or more of the edges in each of the layers, wherein the one or more edges in each of the layers represent a respective level of relationship between the one or more nodes in that layer, wherein the level of relationship comprises one or more of a primary relationship, a secondary relationship, or a tertiary relationship; and generating, for each of the plurality of regions, the compressed graph multi-edge tree from the corresponding graph multi-edge tree by extracting a plurality of high-activating edges across the plurality of layers from the graph multi-edge tree, wherein the compressed graph multi-edge tree comprises the plurality of compressed edges comprising the plurality of high-activating edges across the plurality of layers. The method 900 may then continue at step 930 with the one or more processing devices (e.g., the electronic device). For example, in particular embodiments, the electronic device may generate, for each of the plurality regions, a plurality of graph embeddings associated with each of the mobile devices based on the compressed graph. The method 900 may then continue at step 940 with the one or more processing devices (e.g., the electronic device). For example, in particular embodiments, the electronic device may generate, for each of the plurality of regions based on the plurality of graph embeddings associated with each of the mobile devices, a refined graph associated with each of the mobile devices by reconfiguring one or more edges of the plurality of compressed edges across the plurality of layers in the compressed graph associated with each of the mobile devices. The method 900 may then continue at step 950 with the one or more processing devices (e.g., the electronic device). For example, in particular embodiments, the electronic device may generate a graph high-definition (HD) map associated with each of the mobile devices based on a fusion of the plurality of refined graphs associated with the plurality of regions for each of the mobile devices. The method 900 may then continue at step 960 with the one or more processing devices (e.g., the electronic device). For example, in particular embodiments, the electronic device may identify, based on the graph HD map associated with each of the mobile devices, a plurality of prominent nodes and a plurality of prominent edges connecting the prominent nodes based on trace activations associated with the prominent edges. The method 900 may then continue at step 970 with the one or more processing devices (e.g., the electronic device). For example, in particular embodiments, the electronic device may generate a compressed graph HD map for the environment based on the prominent nodes and prominent edges associated with the one or more mobile devices and environmental information associated with the environment. Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for generating compressed HD maps including the particular steps of the method of FIG. 9, this disclosure contemplates any suitable method for generating compressed HD maps including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Systems and Methods

Figure 10:
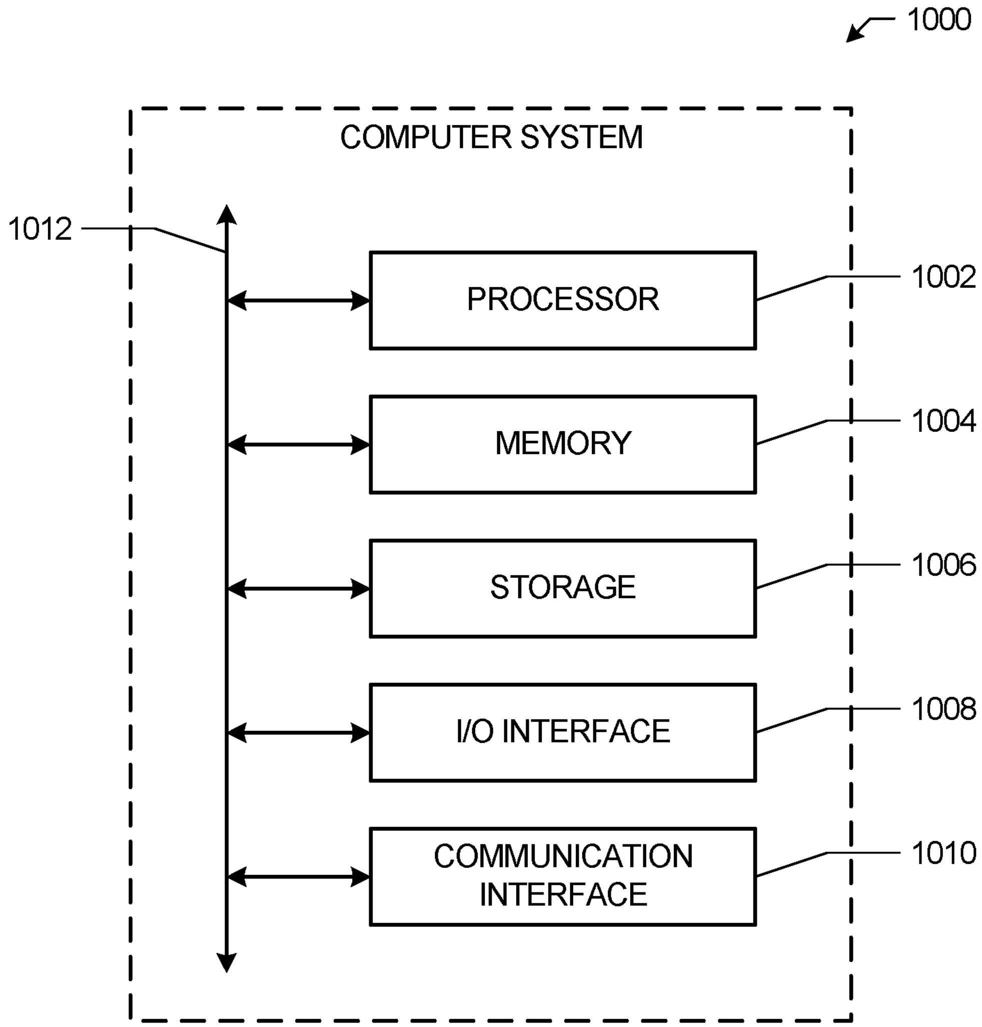
FIG. 10 illustrates an example computer system that may be utilized for generating compressed HD maps, in accordance with the presently disclosed embodiments.

FIG. 10 illustrates an example computer system 1000 that may be utilized for generating compressed HD maps, in accordance with the presently disclosed embodiments. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system

1000 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks.

Where appropriate, one or more computer systems 1000 may perform without substantial spatial or temporal limitation one or more steps of one or more methods described or illustrated herein. As an example, and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement. In particular embodiments, processor 1002 includes hardware for executing instructions, such as those making up a computer program. As an example, and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example, and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002.

Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example, and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere).

One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memory devices, where appropriate. Although this disclosure describes and illustrates particular memory, this disclosure contemplates any suitable memory.

In particular embodiments, storage 1006 includes mass storage for data or instructions. As an example, and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example, and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it.

As an example, and not by way of limitation, computer system 1000 may communicate with an ad hoc network, a personal area network (PAN), a local area network (LAN), a wide area network (WAN), a metropolitan area network (MAN), an ultra-wideband network (UWB), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example, and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by an electronic device:

accessing sensor data captured by one or more mobile devices operating in a plurality of regions in an environment;

generating, for each of the plurality regions, a plurality of graph embeddings associated with each of the mobile devices based on a compressed graph associated with each of the mobile devices constructed from the sensor data, wherein the compressed graph comprises a plurality of nodes and a plurality of compressed edges connecting the nodes across a plurality of layers;

generating, for each of the plurality of regions based on the plurality of graph embeddings associated with each of the mobile devices, a refined graph associated with each of the mobile devices by reconfiguring one or more edges of the plurality of compressed edges across the plurality of layers in the compressed graph associated with each of the mobile devices;

determining a token quantization to identify one or more of a plurality of text tokens of text information associated with each of the mobile devices to compress based on a fusion process of the plurality of text tokens and the plurality of graph embeddings associated with each of the mobile devices;

identifying and removing non-prevalent edges from the plurality of compressed edges associated with each refined graph based on the identified text tokens to compress;

generating a graph high-definition (HD) map associated with each of the mobile devices based on a fusion of the one or more refined graphs associated with the plurality of regions for each of the mobile devices;

identifying, based on the graph HD map associated with each of the mobile devices, a plurality of prominent nodes and a plurality of prominent edges connecting the prominent nodes based on trace activations associated with the prominent edges;

generating a compressed graph HD map for the environment based on the prominent nodes and prominent edges associated with the one or more mobile devices and environmental information associated with the environment; and using the compressed graph HD map to perform autonomous navigation and control.

2. The method of claim 1, further comprising generating the compressed graph associated with each of the mobile devices, wherein the generation comprises:

generating, for each of the plurality regions based on the sensor data, a graph multi-edge tree comprising the plurality of nodes and a plurality of edges connecting the nodes across the plurality of layers, wherein the plurality of nodes correspond to a plurality of objects in the region, wherein one or more of the nodes are connected by one or more of the edges in each of the layers, wherein the one or more edges in each of the layers represent a respective level of relationship between the one or more nodes in that layer; and generating, for each of the plurality of regions, a compressed graph multi-edge tree from the corresponding graph multi-edge tree by extracting a plurality of high-activating edges across the plurality of layers from the graph multi-edge tree, wherein the compressed graph multi-edge tree comprises the plurality of compressed edges comprising the plurality of high-activating edges across the plurality of layers.

3. The method of claim 2, wherein the level of relationship comprises one or more of a primary relationship, a secondary relationship, or a tertiary relationship.

4. The method of claim 1, wherein each of the plurality of graph embeddings associated with each of the mobile devices comprises one or more of edge-level vector information or node-level vector information, wherein each of the plurality of graph embeddings is reconfigurable, and wherein each of the plurality of graph embeddings is associated with a dynamic vector length.

5. The method of claim 1, further comprising:

calculating, based on one or more of an active learning model or an out-of-distribution model, a plurality of trace activations for the plurality of graph embeddings associated with each of the mobile devices based on one or more of a distance metric or a quantitative similarity measure;

wherein generating the refined graph associated with each of the mobile devices for each of the plurality of regions is further based on the plurality of trace activations.

6. The method of claim 1, further comprising:

detecting the text information associated with each of the mobile devices from the environment;

generating, based on the text information, a plurality of text tokens; and determining a plurality of text-graph correspondences indicating a plurality of mappings between one or more of the graph embeddings and one or more of the text tokens.

7. The method of claim 6, further comprising:

determining, for each of the plurality regions, a joint attention associated with each of the mobile devices based on the plurality of text-graph correspondences.

8. The method of claim 7, further comprising:

determining, based on the plurality of graph embeddings associated with each of the mobile devices and the joint attention associated with each of the mobile devices for each of the plurality regions, a joint latent representation associated with each of the mobile devices;

determining, based on the plurality of graph embeddings associated with the plurality of regions and each of the mobile devices, a plurality of first cross latent representations associated with each of the mobile devices; and determining, based on the plurality of joint attentions associated with the plurality of regions and each of the mobile devices, a plurality of second cross latent representations associated with each of the mobile devices.

9. The method of claim 8, wherein generating the graph HD map based on the fusion of the plurality of refined graphs associated with the plurality of regions for each of the mobile devices comprises:

fusing, by a fusion model, the plurality of joint latent representations, the plurality of first cross latent representations, and the plurality of second cross latent representations.

10. The method of claim 1, wherein the one or more mobile devices are one or more vehicles, and wherein the method further comprises:

determining static environmental information associated with the environment, wherein the static environmental information comprises one or more of lane information or road-level information; and determining, based on the sensor data, dynamic environmental information associated with the environment, wherein the dynamic environmental information comprises one or more of environmental localization, scene understanding, textual inference, or road obstruction;

wherein the environmental information comprises the static environmental information and the dynamic environmental information.

11. The method of claim 1, wherein the one or more mobile devices are one or more vehicles, and wherein the method further comprises:

executing one or more processing tasks based on the compressed graph HD map, wherein the one or more processing tasks comprise one or more of navigation, steering, acceleration, or deceleration.

12. The method of claim 1, wherein the one or more mobile devices are one or more vehicles, and wherein the sensor data comprises one or more of LiDAR data, image data, GPS data, inertial-measurement-unit (IMU) data, or radar data.

13. An electronic device comprising:

one or more non-transitory computer-readable storage media including instructions; and one or more processors coupled to the storage media, the one or more processors configured to execute the instructions to:

access sensor data captured by one or more mobile devices operating in a plurality of regions in an environment;

generate, for each of the plurality regions, a plurality of graph embeddings associated with each of the mobile devices based on a compressed graph associated with each of the mobile devices constructed from the sensor data, wherein the compressed graph comprises a plurality of nodes and a plurality of compressed edges connecting the nodes across a plurality of layers;

generate, for each of the plurality of regions based on the plurality of graph embeddings associated with each of the mobile devices, a refined graph associated with each of the mobile devices by reconfiguring one or more edges of the plurality of compressed edges across the plurality of layers in the compressed graph associated with each of the mobile devices;

determine a token quantization to identify one or more of a plurality of text tokens of text information associated with each of the mobile devices to compress based on a fusion process of the plurality of text tokens and the plurality of graph embeddings associated with each of the mobile devices;

identify and remove non-prevalent edges from the plurality of compressed edges associated with each refined graph based on the identified text tokens to compress;

generate a graph high-definition (HD) map associated with each of the mobile devices based on a fusion of the one or more refined graphs associated with the plurality of regions for each of the mobile devices;

identify, based on the graph HD map associated with each of the mobile devices, a plurality of prominent nodes and a plurality of prominent edges connecting the prominent nodes based on trace activations associated with the prominent edges;

generate a compressed graph HD map for the environment based on the prominent nodes and prominent edges associated with the one or more mobile devices and environmental information associated with the environment; and use the compressed graph HD map to perform autonomous navigation and control.

14. The electronic device of claim 13, wherein the one or more processors are further configured to execute the instructions to generate the compressed graph associated with each of the mobile devices, wherein the generation comprises:

generating, for each of the plurality regions based on the sensor data, a graph multi-edge tree comprising the plurality of nodes and a plurality of edges connecting the nodes across the plurality of layers, wherein the plurality of nodes correspond to a plurality of objects in the region, wherein one or more of the nodes are connected by one or more of the edges in each of the layers, wherein the one or more edges in each of the layers represent a respective level of relationship between the one or more nodes in that layer; and generating, for each of the plurality of regions, a compressed graph multi-edge tree from the corresponding graph multi-edge tree by extracting a plurality of high-activating edges across the plurality of layers from the graph multi-edge tree, wherein the compressed graph multi-edge tree comprises the plurality of compressed edges comprising the plurality of high-activating edges across the plurality of layers.

15. The electronic device of claim 13, wherein the one or more processors are further configured to execute the instructions to:

calculate, based on one or more of an active learning model or an out-of-distribution model, a plurality of trace activations for the plurality of graph embeddings associated with each of the mobile devices based on one or more of a distance metric or a quantitative similarity measure;

wherein generating the refined graph associated with each of the mobile devices for each of the plurality of regions is further based on the plurality of trace activations.

16. The electronic device of claim 13, wherein the one or more mobile devices are one or more vehicles, and wherein the one or more processors are further configured to execute the instructions to:

determine static environmental information associated with the environment, wherein the static environmental information comprises one or more of lane information or road-level information; and determine, based on the sensor data, dynamic environmental information associated with the environment, wherein the dynamic environmental information comprises one or more of environmental localization, scene understanding, textual inference, or road obstruction;

wherein the environmental information comprises the static environmental information and the dynamic environmental information.

17. A computer-readable non-transitory storage media comprising instructions executable by a processor to:

access sensor data captured by one or more mobile devices operating in a plurality of regions in an environment;

generate, for each of the plurality regions, a plurality of graph embeddings associated with each of the mobile devices based on a compressed graph associated with each of the mobile devices constructed from the sensor data, wherein the compressed graph comprises a plurality of nodes and a plurality of compressed edges connecting the nodes across a plurality of layers;

generate, for each of the plurality of regions based on the plurality of graph embeddings associated with each of the mobile devices, a refined graph associated with each of the mobile devices by reconfiguring one or more edges of the plurality of compressed edges across the plurality of layers in the compressed graph associated with each of the mobile devices;

determine a token quantization to identify one or more of a plurality of text tokens of text information associated with each of the mobile devices to compress based on a fusion process of the plurality of text tokens and the plurality of graph embeddings associated with each of the mobile devices;

identify and remove non-prevalent edges from the plurality of compressed edges associated with each refined graph based on the identified text tokens to compress;

generate a graph high-definition (HD) map associated with each of the mobile devices based on a fusion of the one or more refined graphs associated with the plurality of regions for each of the mobile devices;

identify, based on the graph HD map associated with each of the mobile devices, a plurality of prominent nodes and a plurality of prominent edges connecting the prominent nodes based on trace activations associated with the prominent edges;

generate a compressed graph HD map for the environment based on the prominent nodes and prominent edges associated with the one or more mobile devices and environmental information associated with the environment; and use the compressed graph HD map to perform autonomous navigation and control.

18. The computer-readable non-transitory storage media of claim 17, further comprising instructions executable by the processor to generate the compressed graph associated with each of the mobile devices, wherein the generation comprises:

generating, for each of the plurality regions based on the sensor data, a graph multi-edge tree comprising the plurality of nodes and a plurality of edges connecting the nodes across the plurality of layers, wherein the plurality of nodes correspond to a plurality of objects in the region, wherein one or more of the nodes are connected by one or more of the edges in each of the layers, wherein the one or more edges in each of the layers represent a respective level of relationship between the one or more nodes in that layer; and generating, for each of the plurality of regions, a compressed graph multi-edge tree from the corresponding graph multi-edge tree by extracting a plurality of high-activating edges across the plurality of layers from the graph multi-edge tree, wherein the compressed graph multi-edge tree comprises the plurality of compressed edges comprising the plurality of high-activating edges across the plurality of layers.

19. The computer-readable non-transitory storage media of claim 17, wherein the one or more mobile devices are one or more vehicles, and wherein the media further comprises instructions executable by the processor to:

determine static environmental information associated with the environment, wherein the static environmental information comprises one or more of lane information or road-level information; and determine, based on the sensor data, dynamic environmental information associated with the environment, wherein the dynamic environmental information comprises one or more of environmental localization, scene understanding, textual inference, or road obstruction;

wherein the environmental information comprises the static environmental information and the dynamic environmental information.

* * * * *